United States Patent Office 3,422,061
Patented Jan. 14, 1969

3,422,061
COALESCEABLE POLYIMIDE POWDERS FROM A POLYCARBOCYLIC AROMATIC DIANHYDRIDE AND PHENYLENE DIAMINE
Walter George Gall, Shellbourne, Del., assignor to E. I. du Pont de Nemours and Company, Wilmington, Del., a corporation of Delaware
No Drawing. Filed Oct. 18, 1963, Ser. No. 317,121
U.S. Cl. 260—47  11 Claims
Int. Cl. C08g 20/32

This invention relates to certain polyimides which have excellent resistance to thermal degradation and which can be prepared as powders which can readily be coalesced to form either billets, from which finished articles can be machined, or into finished articles directly.

It is an object of this invention to form such a coalesceable polyimide of high thermal stability using meta- or para-phenylene diamine, the simplest of aromatic diamines.

While polyimides of meta-and para-phenylene diamine have been made using dianhydrides such as pyromellitic dianhydride, it has not been possible to mold such polyimides since their degradation temperatures of approximately 550 to 575° C. are below the temperature required to mold the polyimides into shapes of any size. It has now been found that tetracarboxylic acid dianhydrides of the structure:

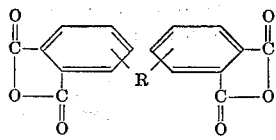

wherein R is selected from group consisting of

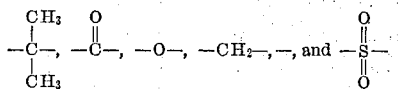

condense with either or both meta- and para-phenylene diamine to form coalescable polyimide powders of high thermal stability.

These polyimides have the structure:

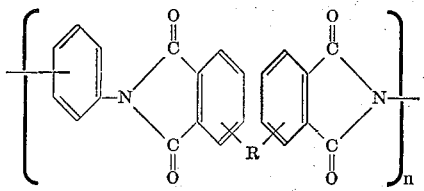

wherein —R— is selected from the group defined above for —R— wherein the bonds to the rings which are shown between two carbon atoms are attached to a carbon atom selected from the two carbon atoms adjacent the point where the bond is indicated, and $n$ is an integer greater than 10. Furthermore, it has been found that mixtures of as little as 16 mole percent of these new dianhydrides with as much as 84 mole percent of pyromellitic dianhydride condense with p-phenylene diamine and as little as 10 mole percent of these anhydrides with as much as 90% pyromellitic dianhydrides condense with m-phenylene diamine to form coalesceable copolyimide powders. These polyimides have the structure:

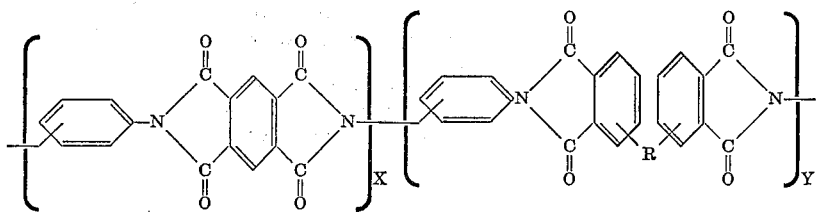

where the ratio of X to Y in the average structure will correspond to the ratio of the amounts of the anhydrides added during the polymerization. These polyimides can be prepared in the form of powders which are readily fabricable, in the range of 300 to 550° C. into useful structures. The polyimide powders of this invention can be made by two types of techniques. Both techniques involve reacting diamine with tetracarboxylic acid dianhydride, in an organic solvent for at least one of the reactants (the solvent having no deleterious effect on either of the reactants) preferably under anhydrous conditions, at a temperature below 175° C. and for a time sufficient to form amide linkages from most of the amine and anhydride groups.

In the first technique the polyamide acid is then precipitated by mixing with a precipitant for the polyamide-acid. The precipitant may be a non-solvent for the polyamide-acid, in which case the particulate solid precipitated is predominantly polyamide-acid. Alternatively, the precipitant may react with the polyamide-acid, e.g., a dehydrating agent to precipitate an insoluble particulate solid that is predominantly polyimide.

When the particulate solid is predominantly polyamide-acid, i.e., a non-solvent is used as the precipitant, the polyamide-acid is converted to the polyimide by treating the polyamide-acid composition with a lower fatty monobasic acid anhydride, preferably acetic anhydride. Although the stoichiometric equivalent, based on the polyamide-acid, of the anhydride is operable alone in the present invention, it is preferred to catalyze the reaction by having some tertiary amine, preferably pyridine, present as well. The ratio of the tertiary amine to anhydride may vary from zero to almost infinite mixtures with a 1:1 ratio being a convenient amount to use with tertiary amines having the activity of pyridine.

Besides acetic anhydride, other operable lower fatty acid anhydrides include propionic, butyric, valeric, mixed anhydrides of these with one another and with anhydrides of aromatic monocarboxylic acids, e.g., benzoic acid, naphthoic acid etc., and with anhydrides of carbonic and formic acids, as well as with aliphatic ketenes (ketene and dimethyl ketene). The preferred anhydrides are acetic anhydride and ketene. Ketenes are regarded as anhydrides of carboxylic acids (ref. Bernthsen-Sudborough, "Textbook of Organic Chemistry," Van Nostrand, 1935, p. 861, and Hackh's "Chemical Dictionary," Blakiston, 1953, p. 468) derived from drastic dehydration of the acids.

Tertiary amines having approximately the same activity as the preferred pyridine may be used in the process. These include 3,4-lutidine, 3,5-lutidine, 4-methylpyridine, 3-methylpyridine, 4-isopropylpyridine, isoquinoline, and 4-benzylpyridine. As mentioned previously, these amines are generally used in approximately equimolar amount with that of the anhydride converting agent. Trimethylamine and triethylenediamine are much more reactive, and, therefore, are generally used in smaller amounts. On the other hand, the following operable amines are less reactive than pyridine: 2-ethylpyridine, 2-methylpyridine, N-ethylmorpholine, N-methylmorpholine, 4-benzoylpyridine, 2,4-lutidine, 2,6-lutidine, and 2,4,6-collidine, and are generally used in larger amounts.

It should be understood that precipitation with a reactant is preferably accomplished by using a conversion agent, e.g. a lower fatty monobasic acid anhydride, as the precipitant. As in the conversion step mentioned previously, it is preferred to use a mixture of the lower fatty monobasic acid anhydride and a tertiary amine in this precipitation step. The product of this step is a polymeric powder that is predominantly polyimide powder. Completion of conversion may be effected by merely maintaining the anhydride in contact with the polymeric powder. However, it is preferred to complete conversion by heating the powder to an elevated temperature, preferably to a temperature above 200° C. but below the crystalline melting point or the decomposition temperature of the polyimide.

It should also be understood that when precipitation is carried out using a non-solvent for the polyamide-acid as the precipitant, then conversion may be effected by heat treatment alone. In this step the particles of polyamide-acid having recurring units of the following structural formula:

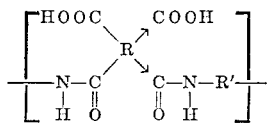

wherein → denotes isomerism, are converted to particles of the corresponding polyimide by heating the polyamide-acid above 50° C., preferably in the presence of a tertiary amine, and then completing the reaction by heating the powder to above 200° C. Heating serves to convert pairs of amide and carboxylic acid groups to imide groups. Heating may be conducted for a period of a few seconds to several hours.

In the second technique the polyamide-acid formed as described above in a solvent for at least one of the reactants, is converted to the polyimide while in solution by heating in the presence of a tertiary amine which acts as a Lewis base. The tertiary amine can form the solvent for the polymerization reaction or can be added after polymerization. This conversion can be carried out in a variety of ways including: (1) heating of a solution of the polyamide-acid in a non-reactive solvent solvent with the tertiary amine, (2) heating of a suspension of the polyamide-acid in a non-reactive, non-solvent with the tertiary amine, and (3) heating of a solution of the polyamide-acid in a tertiary amine in which it is soluble.

In general, all tertiary amines are operable in this second technique, including aliphatic, aromatic, heterocyclic, wherein the tertiary amine is part of the hetero-ring, heterocyclic wherein the hetero-ring is a substituent attached to the amine nitrogen atom and mixed types.

Conversions in solution are preferred and are carried out at from 100° C. to 200° C. As little as 0.1 equivalent of strong amine per mole of polyamide-acid has been effective, however, amounts as large as 6.2 equivalents of strong tertiary amine have been used. The preferred range is from 0.5 to 2.0 equivalents of strong tertiary amine per acid amide group.

Pyridine ($K_B = 1.4 \times 10^{-9}$) is a preferred tertiary amine since it can be used as a solvent for both reactants in making the polyamide-acids as well as functioning as the catalyst for their conversion to polyimides. $K_B$ is the basic ionization constant as listed in the table on page 1202 of the 10th edition of Lange's "Handbook of Chemistry." Pyridine and other tertiary amines having about the same activity ($K_B = 1 \times 10^{-8}$ to $10^{-10}$) are preferably used in an amount such that there is more than one molecule of tertiary amine for each amide-acid group in the polyamide-acid. Suitable tertiary amines having about the same activity as pyridine include 3,4-lutidine, 3,5-lutidine, 4-methylpyridine, 3-methylpyridine, 4-isopropylpyridine, N,N-dimethylaniline, quinoline ($K_B = 6.3 \times 10^{-10}$), isoquinoline, and 4-benzylpyridine. Trimethylamine, triethylamine ($K_B = 8.5 \times 10^{-6}$), N,N-dimethyldodecylamine, and triethylenediamine are more reactive than pyridine and can be used in smaller amounts than pyridine. The following operable tertiary amines are less reactive than pyridine, probably because of steric hinderance, and are used in larger amounts. These include 2-ethylpyridine, 2-methylpyridine, 2,6-lutidine and 2,4,6-collidine. These tertiary amines all have an ionization $K_B$ above $1 \times 10^{-10}$. The polyimides are very insoluble and precipitate out of the polyamide-acid solution as they are formed. The conversion reaction from polyamide-acid to polyimide is preferably carried out at a temperature above 100° C. and below 200° C. Above 200° C. the polyamide-acid begins to degrade rapidly, while below 100° C. the conversion goes too slowly. The water formed by the closing of the polyimide ring can be removed during the reaction by distillation which may lead to more rapid conversion to polyimide and higher molecular weight polymer.

The degree of polymerization of the polyamide-acid is subject to deliberate control. The use of equal molar amounts of the reactants under the prescribed conditions provides polyamide-acids of very high molecular weight. The use of either reactant in excess limits the extent of polymerization. It is preferred that neither reactants be present in over 7 mole percent excess of the other reactant. Instead of using an excess of one reactant to limit the molecular weight of the polyamide-acid, a chain terminating again such as phthalic anhydride or aniline may be used to "cap" the ends of polymer chains. The use of pure reactants and pure solvents will also foster the formation of polyamide-acids, and subsequently polyimides, having high molecular weight. The use of pure materials is also important to prevent incorporation of chemically and/or thermally unstable materials in the ultimate polymer.

In the preparation of the polyamide-acid intermediate, it is essential that the molecular weight be such that the inherent viscosity of the polymer is at least 0.1, and preferably from 0.5 to 5.0. The inherent viscosity is measured at 35° C. at a concentration of 0.5% by weight of the polymer in a suitable solvent. For the preferred range given above N,N-dimethylacetamide is the solvent. To calculate inherent viscosity, the viscosity of the polymer solution is measured relative to that of the solvent alone by measuring the times of flow of equal volumes through the capillary of a standard viscometer and using the following equation:

$$\text{Inherent viscosity} = \frac{\text{natural logarithm} \left( \frac{\text{solution time}}{\text{solvent time}} \right)}{C}$$

where $C$ is the concentration expressed in grams of polymer per 100 milliliters of solution. As known in the polymer art, inherent viscosity is directly related to the molecular weight of the polymer.

The presence of polyamides is evidenced by their insolubility in cold basic reagents as opposed to the rapid solubility of the polyamide acid. Their presence is also apparent if the polyamide-acids are scanned with infrared during conversion to polyimide. The spectra initially show a predominating absorption band at ca. 3.1 microns due to the NH band. This band gradually disappears and as the reaction progresses, the polyimide absorption band appears, a doublet at ca. 5.64 and 5.89 microns and a peak at 13.85 microns. When conversion is completed, the characteristic polyamide bands predominate.

It is obvious that agitation due to boiling of a liquid or to mechanical agitation will aid in precipitating the solid polyimide in the form of a finely divided powder. Mechanical agitation will also aid in preventing skin formation on the sides of the containing vessel and will improve heat transfer from the walls to the liquid. The particles of polyimides, produced by the process of this invention, are characterized by surface areas of at least 0.1 square meter/gram, usually above 1 and preferably from 2 to 500 square meters/gram, as measured using the technique described by F. M. Nelson and F. T. Eggersten, Anal. Chem. 30, 1387 (1958).

The inherent viscosity of the polyimide is measured at 35° C. as a 0.5% by weight solution in a suitable solvent. The solvent can be selected from the group consisting of (100%) sulfuric acid, fuming nitric acid, the monohydrate of dichlorotetrafluoroacetone and the monohydrate of monochloropentafluoroacetone. If the polyimide is not soluble in any of these solvents to the extent of 0.5% and if particles of the polyimide can be formed into a strong coalesced disc (tensile strength greater than 1000 p.s.i.) by the process described hereinafter, then its inherent viscosity may be considered to be greater than 0.1. To confirm this, one may obtain the intrinsic viscosity. This viscosity is determined by measuring viscosity at several lower concentrations, plotting the values, and extrapolating to infinite dilution. The intrinsic viscosity, the viscosity at infinite dilution, for polyimides of this invention should also be above 0.1, and preferably from 0.3 to 5.

The starting materials for forming the products of the present invention are meta or para-phenylene diamine and tetracarboxylic acid dianhydrides, characterized by the formula:

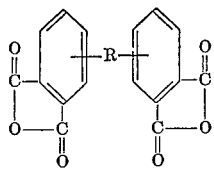

wherein —R— is selected from the group consisting of:

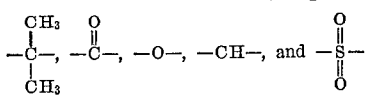

which dianhydrides may be substituted in part by pyromellitic dianhydride as set forth above.

Illustrations of these dianhydrides include 2,2-bis(3,4-dicarboxyphenylpropane) dianhydride, 3,3',4,4' - benzophenonetetracarboxylic dianhydride, bis(3,4 - dicarboxyphenyl)ether dianhydride, 3,3',4,4'-diphenylmethanetetracarboxylic dianhydride, 2,3,3',4' - benzophenonetetracarboxylic dianhydride, and bis(3,4 - dicarboxyphenyl)sulfone dianhydride.

The inclusion of diamines or dianhydrides other than those disclosed may detract from one or more of the desirable properties of the polyimides of this invention. Aliphatic diamines or aliphatic dianhydrides are examples of intermediates which generally detract from the thermal stability of the resultant polyimide. It is obvious that inclusion of small amounts (e.g., 0.1 to 25%) of such intermediates may modify the outstanding properties of the preferred compositions only to the degree that they are present, and such compositions will still be useful and valuable for certain applications and are intended to be within the class of polyimides of this invention.

The solvents useful in the solution polymerization process for synthesizing the polyamide-acid compositions are the organic solvents whose functional groups do not react with either of the reactants (the diamines or the dianhydrides) to any appreciable extent. Besides being inert to the system and being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least one reactant, and contains functional groups other than primary and secondary amino groups; hydroxyl or thiol groups, and other than carboxylic acid groups or carboxylic anhydride groups. The normal liquid solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyimide powders by evaporation, displacement or diffusion. Other typical compounds of this useful class of solvents are: N,N - diethylformamide, N,N - diethylacetamide, N,N-dimethylmethoxyacetamide, N-methyl - 2 - pyrrolidone, N-methylcaprolactam, etc. Other solvents which may be used in the present invention are: dimethylsulfoxide, tetramethylurea, pyridine, dimethylsulfone, hexamethylphosphoramide, tetramethylenesulfone, formamide, N-methylformamide, butyrolactone, and N - acetyl-2-pyrrolidone. The solvents can be used alone, in combinations of solvents, or in combination with poor solvents such as benzene, benzonitrile, dioxane, xylene, toluene and cyclohexane.

The finely-divided, high surface area polyimides prepared according to the techniques described above can be made to coalesce, at temperatures below the crystalline melting point or degradation temperature, into solid, homogeneous objects under the influence of heat and pressure. One coalescing process requires the application of a pressure of from 200 to about 30,000 p.s.i. to the particulate polyimide after the particles have been heated to a temperature in the range of 200° C. to 575° C. and preferably from 350° C. to 530° C. The temperature must be maintained below the degradation temperature of the polyimide which is about 550–575° C. for many of the polyimides of this invention. The particulate polyimide can be heated to the requisite temperature either before or after it is placed in the mold. Although some deformation or flow of these polyimide particles is necessary to obtain coalesence, such flow or deformation is extremely limited in these polyimide particles thereby making fabrication by conventional plastics-forming techniques impractical. Fabrication by coalescence of discs 1.25 inches in diameter and about 0.085 inch in thickness provides convenient pieces for testing since the problems of reproducibility of fabrication conditions are reduced to a minimum. The tensile strength of bars cut from these chips can be used as the criterion of integrity and quality of the fabricated piece and, therefore, of the usefulness of the original powder.

The strength of the polyimide disc fabricated in the optimum fashion is increased markedly in the case of the products described herein where the surface area of the powder is at least 0.1 square meter/gram. A further significant improvement results from increasing the inherent viscosity or intrinsic viscosity of the polyimide to at least 0.5 and preferably higher. The strength of these discs is related to the usefulness of this polymer powder for a variety of applications. The powders which yield discs having tensile strengths below 2500 p.s.i. may not be useful for certain mechanical applications, but coalesced objects having such low strengths are useful in the form of electrical insulation for use at high temperatures or as thermal barriers where very high temperatures are encountered, or as a radiation resistant material. The powders which yield discs having tensile strengths of 2500 p.s.i. or greater are useful when coalesced into such articles as gears, bearings, mechanical seals, etc. It should be understood that the tensile strength is a measurement of only one useful property and that polyimide articles having a high tensile strength may not always be better for every use than those at the low end of the range. For the purpose of the present invention, polyimide particles displaying a tensile strength when coalesced from 1000 to 50,000 p.s.i. are preferred.

The procedures for testing the polyimide powders and the products fabricated therefrom follow:

SURFACE AREA

Surface areas were measured by adsorption of nitrogen from a gas stream of nitrogen and helium at liquid nitrogen temperature, using the technique described by F. M. Nelson and F. T. Eggersten (Anal. Chem. 30, 1387 (1958)). Sample weights are in the order of 0.1 to 3.0 g. The themal conductivity detector is maintained at 40° C. and the flow rate of gas is approximately 50 ml./min. The gas mixture used is 10 parts by weight nitrogen and 90 parts by weight helium. The samples are purged with the nitrogen-helium mixture at room temperature. Adsorption peaks are generally used for the determinations, since tailing effects are more pronounced upon desorption. Calculation of surface area is done as described by Nelson and Eggersten. The values of surface area obtained correspond closely to values obtained using the classical B.E.T. Method (S. Brunauer, P. H. Emmett, and E. Teller, JACS 60, 309 (1938)).

FABRICATION OF THE TEST SPECIMEN

Two and one-half grams of high surface area polyimide powder are weighed out for each disc to be fabricated and added to the mold case. This is lightly tamped or shaken to a level load before completing the assembly of the case. Two mil-thick copper discs are used above and below the resin charge to prevent sticking to the metal parts.

Each mold case is provided with its own heater of 750 w. capacity which is fitted tightly to the case. The loading piston is spirally grooved to reduce the contact area by one-half and to assist in providing a path for any gas loss during molding and facilitating smooth easy motion when it is pressed through the case as a means of ejecting the molding specimens. A recessed backup block is used for the ejecting operation, providing sufficient bottom room for the respective pieces.

Each band heater is powdered through a variable transformer at approximately 8.5 amps at 115 volts and is controlled by an I.C. thermocouple.

The mold case, after charging is placed on an insulating plate prepared from ⅛" "Transite"; a second ⅛" "Transite" plate is placed on the mold piston. These are used to minimize heat losses to the press platens during the fabrication cycle.

A 20 ton capacity "Preco" press is used for the coalescing operation. The assembled mold case with resin charge is placed between the insulated platens and wrapped with approximately ⅝" of soft glass wool insulation, and the press closed until resin is loaded to 2,000 p.s.i.

The mold case is now heated to the appropriate coalescence temperature as indicated in the examples for specific polymers and the pressure is held at 2,000 p.s.i. through this heating cycle. The temperature is now held at the control point for 5 to 20 minutes at the beginning of which time the pressure is rapidly increased to 6,000 to 20,000 p.s.i. Heat is then cut immediately, insulation is removed and a strong air blast is directed at the mold case effecting cooling to 200 to 300° in approximately 10 minutes. Cooling to lower temperatures does not affect the finished piece, but cycles are shorter if the chip is removed at a temperature in this range. The pieces are now pressed out. They will consistently run from 70 to 90 mils in thickness.

A ⅜" wide bar is cut from the chip. Then the width of the center portion of this bar is reduced to ⅛" by milling out a ⅛" portion on each side, using a 1" diameter drill. The tensile strength and elongation of this piece are then obtained on a standard "Instron" or similar tester of a strain rate of 0.2"/min. using a gauge length of 0.6".

The following examples are illustrative of the invention.

EXAMPLE I

A solution of 5.4073 g. of purified m-phenylene diamine in 50 ml. of purified dry pyridine was added to 16.8153 g. of solid 2,2-bis(3,4-dicarboxyphenyl)propane dianhydride, rinsing in with 22 ml. of pyridine in two portions. The dianhydride dissolved rapidly, forming a viscous solution whose inherent viscosity was found to be 2.0. After standing for thirty minutes at room temperature, this polyamide-acid solution was forced under nitrogen pressure into a stirred reactor containing 57 ml. of pyridine boiling under reflux. Heating under reflux was continued for three hours, but no precipitation of the polyamide occurred. The polyimide in solution was isolated by dilution of the mixture with ten times its volume of acetone. The white precipitate which formed was separated by filtration and was acetone washed before drying in a vacuum oven at 60° C. Finally the product was given a heat treatment at 300 to 325° C. under nitrogen for 6.5 hours. An X-ray diffraction study indicated that the white product was amorphous. A two gram sample of this powder was fabricated into a 1¼" diameter chip, following the procedure described above using a coalescence temperature of 360° C. and an upper pressure of 6,000 p.s.i. The product was reddish-brown in color and was transparent. Its density strengths of 21,350 p.s.i. and ultimate elongations of 5.4%.

Exposure of other test specimens, made by the same technique, to boiling water for 500 hours resulted in losses of only 12% in tensile strength and 18% in ultimate elongation, indicating a very high degree of hydrolytic stability.

EXAMPLE II

A solution of 5.4073 g. of purified p-phenylene diamine in 80 ml. of purified, dry pyridine was added with stirring to 16.8153 g. of 2,2-bis(3,4-dicarboxyphenyl)propane dianhydride. The solution (inherent viscosity=2.5) was then run into 50 ml. of boiling pyridine. After an additional three hours heating under reflux with stirring, the precipitated polyimide was separated by filtration and purified by acetone washing and vacuum drying at 60° C. Finally the product was given a heat treatment under nitrogen at 310° C. for 7.5 hours. An X-ray diffraction study indicated that the white product had a crystallinity index of 45%. This index indicates the percentage of the total area under the diffractometer scan which is contributed by the crystalline component of the product. A 2.5 g. sample was fabricated into a 1¼" diameter chip at 465° C. and 20,000 p.s.i. for twenty minutes. The chip was chocolate brown in color and had a tensile strength of 17,350 p.s.i. with an ultimate elongation of 4.2%.

EXAMPLE III

A stirred mixture of 17.91 g. of 3,3'4,4' benzophenonetetracarboxylic acid and 60 ml. of phenyl ether was heated at 250° C. until the solution became clear. After cooling to about 225° C., the mixture was diluted with 60 ml. of purified N,N-dimethylacetamide, followed by the immediate addition of a solution of 5.41 g. of purified m-phenylene diamine in 60 ml. of N,N-dimethylacetamide. After stirring for 2 minutes at 155 to 165° C., a sample was removed for inherent viscosity measurement and a solution of 7.6 g. of triethylamine in 10 ml. of N,N-dimethylacetamide was added immediately afterward and the temperature was then maintained at 145–150° C. for twenty minutes. The inherent viscosity of the polymer solution was found to be 0.33. The product began to precipitate about three minutes after the addition of the triethylamine solution. When the heating period was complete, the product was separated by filtration and purified by acetone washing and vacuum drying at 60 to 80° C. The product was then heat-treated under nitrogen at 325° C. for 16 hours, yielding 17 g. of pale yellow powder. An X-ray diffraction study indicated that this powder had a crystallinity index of 58%. The thermal stability of this powder was measured at 450° C. in air. After an initial rapid weight loss of 0.8% representing residual solvents and impurities, the thermal degradation rate was found to be 0.008% min. A fourteen gram sample was fabricated into a brown 3″ diameter chip at 410° C. and 20,000 p.s.i. for twenty minutes. Its average tensile strength was 12,400 p.s.i. with a 5.5% elongation.

EXAMPLE IV

Example III is repeated substituting an equal weight of p-phenylene diamine for the m-phenylene diamine used in Example II. The inherent viscosity of the intermediate polyamide-acid was 0.41. Precipitation of the polyimide occurred almost immediately after the addition of the triethylamine at 150° C. Similar workup and heat treatment yielded 18.5 g. of yellow powder with a surface area of 228 m.$^2$/g. An X-ray crystallinity index of 47% was obtained and a 450° C. thermal degradation rate in air of 0.016%/min. was measured. A chip was fabricated at an upper temperature of 465° C. and pressure of 20,000 p.s.i. holding for twenty minutes. The chip had a tensile strength of 2,500 p.s.i. at an elongation of 1.0%.

EXAMPLE V

A solution of 5.4073 g. of purified m-phenylene diamine in 95 ml. of purified pyridine was added to 15.512 g. of purified bis(3,4-dicarboxyphenyl)ether dianhydride, rinsing in with 20 ml. of pyridine in two portions. After stirring for thirty minutes, a clear polyamide-acid solution of 0.32 inherent viscosity was obtained. This solution was run into 34 ml. of pyridine which was boiling under reflux. The mixture was stirred and heated under reflux for three hours. The precipitated white solid was separated by filtration and purified by acetone washing and air drying. It was then heat-treated under nitrogen at 325° C. for six hours. An X-ray crystallinity index of 62% was obtained on this powder and its surface area was 87 m.$^2$/g. Chips were fabricated from this powder at 450° C. and 20,000 p.s.i. using the procedure described above. They were yellow in color rather than the usual brown-black of many other polyimides fabricated this way, indicating exceptionally high thermal stability for this polyimide. The tensile strength of the chips was 11,800 p.s.i. at 2.5% elongation.

EXAMPLE VI

A stirred mixture of 15.6663 g. of slightly impure bis(3,4-dicarboxyphenyl)ether dianhydride and 60 ml. of phenyl ether was heated to 225° C. at which point complete solution occurred. The solution was then diluted with 60 ml. of N,N-dimethylacetamide, followed immediately afterward by the addition of a warm solution of 5.4073 g. of p-phenylene diamine in 90 ml. of N,N-dimethylacetamide. After stirring for one minute at 140–150° C., a solution of 7.6 g. of triethylamine in 10 ml. of N,N-dimethylacetamide was added. The mixture was kept at 150–155° C. for 19 minutes while the product precipitated. The yellowish solid was isolated by filtration and purified by acetone washing and vacuum drying at 60° C. Heat treatment under nitrogen at 310° C. for 7.5 hours yielded 16 g. of yellow polyimide with a surface area of 21 m.$^2$/g. An X-ray crystallinity index of 36% was obtained in this powder. A chip was fabricated using a 15 minute, 530° C., 20,000 p.s.i. cycle in the technique described above. The chip had a tensile strength of 3,000 p.s.i. at 1% elongation.

EXAMPLE VII 3.0825 g. of solid 3,3′4,4′,-diphenylmethanetetracarboxylic dianhydride was added to a solution of 1.0815 g. of purified m-phenylene diamine in 30 ml. of purified pyridine. After agitating for thirty minutes, the inherent viscosity of the resulting polyamide-acid was found to be 0.24. This solution was then run into 15 ml. of pyridine which was kept stirred and boiling under reflux. After three hours additional heating under reflux only partial precipitation of the polyimide had occurred so the mixture was diluted with a large excess of acetone and the precipitate was then filtered, washed with acetone and vacuum dried at 60° C. Heat treatment under nitrogen for 17 hours at 275° C. yielded a tan powder. An X-ray crystallinity index of 0% was obtained on this powder. A brown chip was fabricated from this powder at 400° C. and 20,000 p.s.i. for 10 minutes using the coalescing technique described above. Its tensile strength was 13,500 p.s.i. at 5.1% elongation.

EXAMPLE VIII

The procedure of Example VII was repeated except the m-phenylene diamine was replaced with an equal weight of p-phenylene diamine. Similar workup and heat treatment yielded a yellow-tan powder. A chip was fabricated from this powder at 490° C., 20,000 p.s.i. using a 20 minute cycle. Its tensile strength was approximately 10,000 p.s.i.

EXAMPLE IX

A solution of 2.1629 g. of purified m-phenylene diamine in 50 ml. of dry pyridine was treated with 7.1649 g. of solid, purified bis(3,4-dicarboxyphenyl)sulfone dianhydride. After agitating for thirty minutes, the solid was completely dissolved and the solution had become very viscous. Its inherent viscosity was 0.9. This solution was run into 25 ml. of refluxing, dry pyridine with stirring and the heating of the mixture under reflux was continued for 4½ hours. Precipitation of the polyimide was slow, and occured mostly during the last hour of heating. The product was isolated by filtration and was purified by two acetone washes, vacuum drying and 16 hours heat treatment under nitrogen at 300° C. The color of the product was off-white and its surface area was 25 m.$^2$/g.

It was fabricated at 435° C. under 20,000 p.s.i. pressure and test speciments cut from these pieces had tensile strengths of 12,000 p.s.i. at 2.3% elongation.

EXAMPLE X

A suspension of 7.8856 g. of bis(3,4-dicarboxyphenyl)-sulfone in 30 ml. of phenyl ether was heated at 250° C. until complete solution occurred, allowing the steam formed in the dehydration to escape. The solution was cooled to 230° C. and 30 ml. of purified N,N-dimethylacetamide was added, followed by a solution of 2.1629 g. of purified p-phenylene diamine in 30 ml. of N,N-dimethylacetamide at about 165° C. After stirring for one minute, a solution of 3.0 g. of triethylamine in 3 ml. of N,N-dimethylacetamide was added and stirring was continued for 20 minutes, keeping the temperature of the mixture near 150° C. The precipitated polyimide was then filtered off, acetone washed, dried at 60° C. and heat treated under nitrogen at 300° C. for 16 hours. Its surface area was 52 m.$^2$/g.

The product was fabricated into a chip at 460° under 10,000 p.s.i. pressure. Test specimens had 6,100 p.s.i. tensile strength at 1.1% elongation.

EXAMPLE XI

A solution of 2.035 g. of p-phenylene diamine in 40 ml. of purified pyridine was added to 5.3122 g. of 2,2-bis(3,4-dicarboxyphenyl)propane dianhydride and 1.0051 g. of 3,3′4,4′-benzophenonetetracarboxylic dianhydride (corresponding to 16 mole percent of the latter) rinsing in with 10 ml. of pyridine in two portions. After stirring for thirty minutes the inherent viscosity of the copolyamide acid was measured and found to be 1.1. This solution was then run into 30 ml. of pyridine which was stirred and boiled under reflux. Heating under reflux was continued for three hours during which time the solution became cloudy but the product did not precipitate out. The mixture was diluted with a large amount of acetone to precipitate the copolyimide which was filtered off, acetone washed, and vacuum dried at 60° C. Heat treatment under nitrogen at 290–310° C. for seven hours yielded a gray-white powder with a surface area of 184 m.²/g. The crystallinity of this powder was 6%. The powder was fabricated into a chocolate brown chip at 400° C. using only 6,000 pressure for five minutes. Its tensile strength was 20,300 p.s.i. at an elongation of 10.7%.

Example XII and XIII illustrate making a grinding wheel from the polyimide of this invention.

EXAMPLE XII

A mixture of 1.2 parts by weight of finely divided 3,3′,4,4′-tetracarboxybenzophenone-m-phenylene diamine polyimide made in accordance with Example III and 1.0 part by weight of diamond particles were blended thoroughly by rolling in a cylindrical jar for several hours. The polyimide powder all passed a 100 mesh screen. The diamond particles passed a 100 mesh screen but were retained by a 120 mesh screen. A portion of this resin was coalesced into a hollow cylinder having an internal diameter of 5.75″, an external diameter of 6.00″ and a height of 0.250″ by pressing in a mold at 30,000 p.s.i. and 400° C. for one hour. This ring was then glued to the rim of a circular aluminum plate 0.250″ thick (which had been carefully machined to fit tightly inside of the ring) using "Glom O-N," a commercial adhesive made by Thermo-Resist Inc. After curing of the adhesive, a 1.25″ diameter hole was machined in the exact center of this plate. The wheel was now mounted on a spindle and trued by dressing to give less than 0.002″ runout in either the peripheral or lateral directions. This grinding wheel was tested on an 8″ x 24″ Gallmeyer and Livingston horizontal surface grinder. It was found that this wheel removed two times greater volume of "Carboloy" 370 per unit volume of wheel lost than does a corresponding wheel using a phenol-formaldehyde resin binder, both being tested under identical conditions. The ability of the polyimide wheel to retain its edge contour was also superior to that of the phenol-formaldehyde resin wheel.

EXAMPLE XIII

A mixture of 1.2 parts by weight of finely divided, 2,2-bis(3,4 - dicarboxyphenyl)propane-p-phenylene diamine polyimide made according to Example II and 1.0 part by weight of diamond particles. The polyimide particles all passed a 200 mesh screen and the diamonds a 600 mesh screen. A wheel coalesced according to Example II could be used to produce a one micro-inch finish consistently on tungsten carbide blocks. Corresponding wheels using phenol-formaldehyde resin as binders would not produce better than four micro-inch finishes under comparable conditions. Similar favorable results were observed on honing sticks and cup wheels fabricated from this same mixture.

EXAMPLE XIV

A solution of 5.4073 g. m-phenylene diamine in 80 ml. of pure, dry pyridine was added with stirring to 10.9065 g. of pyromellitic dianhydride, washing in with two 10 ml. portions of pyridine. After stirring for 30 minutes, the inherent viscosity of the solution was measured and found to be 0.38. The solution was then run into 50 ml. of boiling pyridine over a 5 minute period. The polyimide began to precipitate almost immediately. After an additional heating period of 80 minutes under reflux, the suspension was filtered and the product was purified by washing twice with acetone, vacuum drying at 60° C. and heat treating under nitrogen at 310° for 7.5 hours, yielding 11.0 g. (76%) of bright yellow polyimide powder.

Attempts were made to fabricate this product into 1¼″ chips by coalescing under the indicated conditions:

| Temp. (deg.) | Pressure (p.s.i.) | Time (min.) | Appearance of Product |
| --- | --- | --- | --- |
| 525 | 20,000 | 10 | Broken brown pieces were not well-cohered. |
| 540 | 22,000 | 5 | Do. |
| 550 | 22,000 | 5 | Do. |
| 560 | 20,000 | 5 | Broken brown-black pieces were not well-cohered. |
| 575 | 20,000 | 10 | Black, very brittle. |

It is clear that decomposition (as indicated by blackening) occurred above 550°, preventing attainment of good coherence.

EXAMPLE XV

A solution of 5.4073 g. of purified m-phenylene diamine in 70 ml. of dry pyridine was added to 9.6115 g. (0.042 mole) of purified pyromellitic dianhydride with stirring rinsing in with 20 ml. pyridine. After five minutes, 2.5779 g. (0.008 mole) of purified 3,3′,4,4′-benzophenonetetracarboxylic dianhydride was added to the low viscosity polyamide-acid solution. The viscosity rose as the second dianhydride dissolved and, when it was all in solution, this solution was run into 50 ml. of boiling pyridine, which was stirred under reflux. After completion of the addition, stirring under reflux was continued for 100 minutes. Initial precipitation of the copolyimide occurred after ten minutes. The product was separated by filtration and was purified by acetone washing, drying and heat treating under nitrogen for 7 hours at 300–325°. The crystallinity index of this yellow powder was 61% and its thermal degradation rate in air at 450° was 0.0085%/min. A 1¼″ chip was coalesced at 500°/25,000 p.s.i. for 10 minutes. It was chocolate brown in color, its density was 1.481 g./ml. and its tensile strength was approximately 10,000 p.s.i.

EXAMPLE XVI

Pyromellitic dianhydride (9.816 g.) and 1.6815 g. of 2,2-bis(3,4-dicarboxyphenyl)propane dianhydride were added to a solution of 5.4073 g. of m-phenylene diamine in 80 ml. of dry pyridine with agitation. When the anhydrides were completely dissolved, the viscous polyamide-acid solution was run into 50 ml. of boiling pyridine with stirring and the mixture was heated under reflux for 65 minutes. The polyimide began to precipitate during the addition to the hot pyridine. The suspension of product was filtered and the precipitate was washed twice with acetone before drying at 60° and heat treating under nitrogen at 300–325° for 7 hours. The yield of yellow powder with a surface area of 142 m.²/g. was 92%. Its thermal degradation rate at 450 in air was .035%/min. This copolymer contained 90 mole percent of pyromellitic dianhydride and 10 mole percent of 2,2-bis(3,4-dicarboxyphenyl)propane dianhydride.

The coalescibility of this copolymer was borderline. Generally, brown cracked chips were obtained at 500° using 22,000 p.s.i. for 5 minutes. Individual pieces were generally less than about 2,000 p.s.i. in tensile strength. The PMDA–MPD copolymer of Example XV which had only 84% of PMDA was much more readily coalesced. The present copolymer is useful in applications where a high level of mechanical properties is relatively less important, e.g., as a high temperature insulating material.

EXAMPLE XVII

Pyromellitic dianhydride (9.1615 g.) and 2.5779 g. of 3,3′4,4′-benzophenonetetracarboxylic dianhydride were added to a solution of 5.4073 g. of p-phenylene diamine in 80 ml. of dry pyridine with agitation. The anhydrides dissolved with concurrent precipitation of a yellow solid. The resulting viscous suspension was run into 50 ml. of boiling pyridine with stirring and the mixture heated under reflux for 90 minutes. The suspension was then filtered and the precipitate was washed twice with acetone before drying at 60° and heat treating under nitrogen at 300–325° for 7 hours. A 92% yield of yellow-brown solid with a surface area of 11.5 m.²/g. was obtained. Its thermal degradation rate at 450° in air was 0.014%/min. This copolymer contained 84 mole percent pyromellitic dianhydride and 16 mole percent of 3,3′4,4′-benzophenonetetracarboxylic acid.

The coalescibility of this copolymer was borderline with yellow-brown pieces of about 2,000 p.s.i. tensile strength or less being obtainable at 525° at 25,000 p.s.i. for 5 minutes. This product is useful in applications where a high level of mechanical properties is relatively less important e.g., as a high temperature insulating material.

EXAMPLE XVIII

A solution of 6.7261 g. of purified 2,2-bis(3,4-dicarboxyphenyl)propane dianhydride in 40 ml. of dry pyridine was added very slowly to a solution of 4.3258 g. of m-phenylene diamine in 40 ml. of pyridine with agitation under anhydrous conditions. Then, 4.3626 g. of solid pyromellitic dianhydride was added and stirring was continued. After 25 minutes, a sample was withdrawn and found to have an inherent viscosity of 0.65. The solution was then run into 40 ml. of boiling, stirred pyridine and heating under reflux was continued for 3 hours after the addition was complete. The light yellow product was then separated by filtration, washed twice with acetone and dried in a vacuum oven at 60°. Heat treatment under nitrogen for 7.5 hours at 310° yielded 6.0 g. of yellow imide copolymer. The crystallinity index of the product was 47%.

The powder was coalesced into a brown chip at 425°, using 8,000 p.s.i. pressure 15 minutes. Its tensile strength was approximately 5,000 p.s.i.

EXAMPLE XIX–XXV

The quantities of pyromellitic dianhydride and other dianhydride indicated in the table below were added to a solution of 5.4073 g. of the indicated diamine in 80 ml. of dry pyridine with agitation in a dry nitrogen blanketed flask. After 30 minutes, the resulting solution or suspension was run into 50 ml. of stirred, boiling pyridine and heating under reflux was continued for 120 minutes. At this point, excess acetone was added to insure complete precipitation of the polyimide and the suspension was filtered. The precipitate was washed twice with acetone before drying at 60°. Heat treatment was carried out in each case at 300–325° under nitrogen for 8 hours. Yields of polyimide product greater than 75% were obtained in each case. The coalescibility of the product was evaluated in each case by attempted molding at several temperatures in the 400–550 temperature range.

| Example | Phenylene diamine used | PMDA Wt. (g.) | Wt. (and mole percent) of other dianhydride | Coalescible(?) |
|---|---|---|---|---|
| 19 | Meta | 9.816 | 1.5413 g. (10%) PMP | Borderline. |
| 20 | do | 9.1615 | 2.8660 g. (16%) PSP | Yes. |
| 21 | do | 9.1615 | 2.4818 g. (16%) POP | Yes. |
| 22 | Para | 9.1615 | 2.6904 g. (16%) PAP | Borderline. |
| 23 | do | 9.1615 | 2.4660 g. (16%) PMP | Do. |
| 24 | do | 8.725 | 3.5825 g. (20%) PSP | Yes. |
| 25 | do | 8.725 | 3.1022 g. (20%) POP | Yes. |

PAP=2,2-bis(3,4-dicarboxyphenyl)propane dianhydride; POP=bis(3,4-dicarboxyphenyl) ether dianhydride; PMP=3,3',4,4'-diphenylmethanetetracarboxylic dianhydride; PSP=bis-(3,4-dicarboxyphenyl)sulfone dianhydride.

The polyimide particles of this invention find many applications. Since fabricated parts of these polyimides retain their strength and excellent response to work-loading at elevated temperatures for prolonged periods of time, they offer commercial utility in a wide range of uses. The polyimide polymers of this invention are distinguished in having a combination of excellent resistance to corrosive atmospheres, and outstanding resistance to degradation by high energy particles and gamma ray radiation. These polymers resist melting upon exposure to high temperatures for extended periods of time, while retaining hitherto unrealized high proportions of room temperature physical properties. Because of the unusual and surprising ability of the high surface area particles to coalesce at a temperature below their melting point, under heat and pressure, these polymers may be processed into many articles not obtainable by other means. This is particularly surprising in view of the fact that other polyimide powders derived from m- or p-phenylene diamine, both very inexpensive aromatic diamines, are not coalescable.

The polyimides of this invention are also useful in combination with other materials; e.g., finely divided metals, metal oxides, minerals, synthetic inorganics, glasses, and other high temperature polymers such as polytetrafluoroethylene. These materials may be incorporated as suspensions in the polyamide-acid solutions so that they will be intimately mixed with the polyimide on forming particles or casting films or forming coatings. They may also be incorporated by mixing of the finished polyimide powder with the modifying solid also in the finely divided state. Graphite improves the frictional properties. Finely divided aluminum makes the solid conductive. Inorganic fillers improve stiffness. Silicon carbide, diamond or other hard materials make the composite an abrasive composition as illustrated in Examples XII and XIII.

The method of fabrication described earlier for use in making test pieces can also be used to make bushings, seal faces, bearings, abrasive wheels, electrical brushes, electrical insulators, compressor vanes, pistons and piston rings, brake linings, clutch faces, gears, thread guides, and cams. The properties of the coalesced polyimides make them outstanding as shaped articles in each of the above uses.

I claim:

1. A coalesceable powder having a surface area of at least 0.1 square meter per gram consisting essentially of a polyimide consisting essentially of repeating units of the structure:

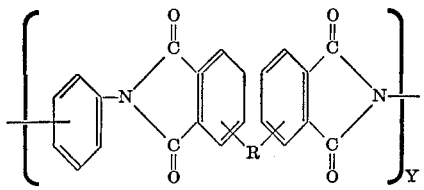

wherein —R— is selected from the group consisting of:

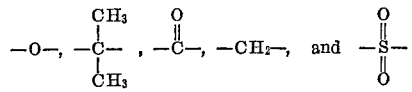

wherein the bonds to the rings which are shown between two carbon atoms are attached to a carbon atom selected from the two carbon atoms adjacent the point where the bond is indicated, and Y is an integer corresponding to an inherent viscosity of at least 0.1 as measured from a 0.5 weight percent solution of the polyimide in 100 percent sulfuric acid at 35° C.

2. The polyimide powders of claim 1 wherein —R— is —O—.

3. The polyimide powders of claim 1 wherein —R— is

4. The polyimide powders of claim 1 wherein —R— is

5. The polyimide powders of claim 1 wherein —R— is —CH$_2$—.

6. The polyimide powders of claim 1 wherein —R— is

7. A coalesceable powder having a surface area of at least 0.1 square meter per gram consisting essentially of a copolyimide consisting essentially of repeating units of the structure:

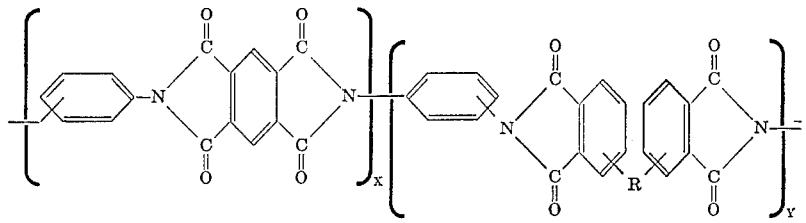

wherein —R— is selected from the group consisting of:

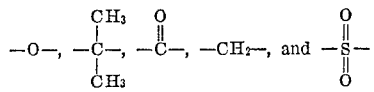

wherein $X+Y$ represents the number of repeating units of said structure and where Y represents at least 16 mole percent of the total repeating units of said structure, wherein the bonds to the rings which are shown between two ring carbon atoms are attached to a carbon atom selected from the two carbon atoms adjacent the point where the bond is indicated and $X+Y$ is an integer corresponding to an inherent viscosity of at least 0.1 as measured from a 0.5 weight percent solution of the polyimide in 100 percent sulfuric acid at 35° C.

8. A coalesceable powder having a surface area of at least 0.1 square meter per gram consisting essentially of a copolyimide consisting essentially of repeating units of the structure:

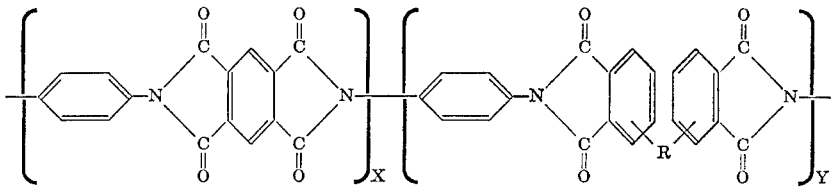

wherein $X+Y$ represents the number of repeating units of said structure and where Y represents at least 16 mole percent of the total repeating units of said copolyimide, wherein —R— is selected from the group consisting of:

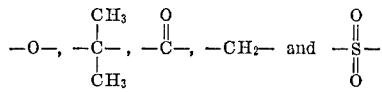

and $X+Y$ is an integer corresponding to an inherent viscosity of at least 0.1 as measured from a 0.5 weight percent solution of the polyimide in 100 percent sulfuric acid at 35° C.

9. A coalesceable powder having a surface area of at least 0.1 square meter per gram consisting essentially of a copolyimide consisting essentially of repeating units of the structure:

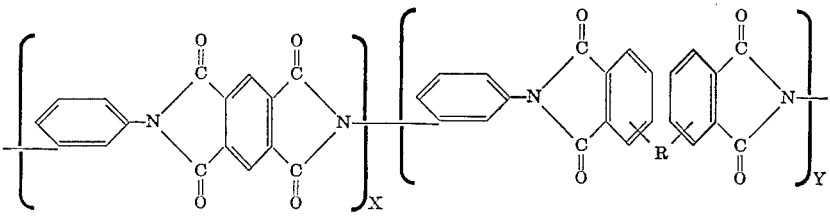

wherein $X+Y$ represents the number of repeating units of said structure and where Y represents at least 10 mole percent of the total repeating units of said copolyimide, wherein —R— is selected from the group consisting of:

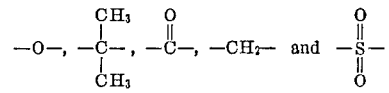

and $X+Y$ is an integer corresponding to an inherent viscosity of at least 0.1 as measured from a 0.5 weight percent solution of the polyimide in 100 percent sulfuric acid at 35° C.

10. A coalesceable powder having a surface area of at least 0.1 square meter per gram consisting essentially of a polyimide consisting essentially of repeating units of the structure:

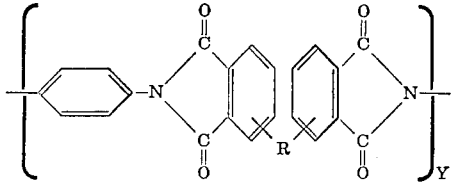

wherein —R— is selected from the group consisting of

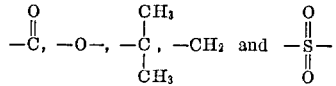

and Y is an integer corresponding to an inherent viscosity of at least 0.1 as measured from a 0.5 weight percent solution of the polyimide in 100 percent sulfuric acid at 35° C.

11. A coalesceable powder having a surface area of at least 0.1 square meter per gram consisting essentially of a polyimide consisting essentially of repeating units of the structure:

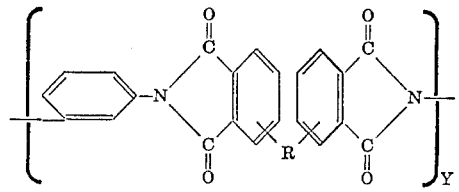

wherein —R— is selected from the group consisting of:
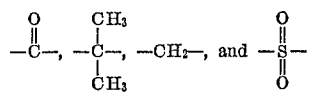
and Y is an integer corresponding to an inherent viscosity of at least 0.1 as measured from a 0.5 weight percent solution of the polyimide in 100 percent sulfuric acid at 35° C.
References Cited
UNITED STATES PATENTS
3,179,631  4/1965  Endrey.
3,249,588  5/1966  Gall.
3,179,614  4/1965  Edwards.
3,179,633  4/1965  Endrey.
WILLIAM H. SHORT, *Primary Examiner.*
H. D. ANDERSON, *Assistant Examiner.*
U.S. Cl. X.R.
51—298; 260—30.8, 32.4, 32.8, 37, 65, 78, 857; 264—109

PO-1050
(5/69)

UNITED STATES PATENT OFFICE
CERTIFICATE OF CORRECTION

Patent No. 3,422,061               Dated January 14, 1969

Inventor(s) Walter George Gall

It is certified that error appears in the above-identified patent and that said Letters Patent are hereby corrected as shown below:

Column 1, line 48; after "from" insert "the".
         line 50; delete "-" after "-$CH_2$-".

Column 3, line 56; delete "solvent" - first occurrence.

Column 4, line 41; "again" should be "agent".
         line 69; "polyamides" should be "polyimides".

Column 5, line 4; "polyamide" should be "polyimide".
         line 47; "-CH-" should be "-$CH_2$-".

Column 7, line 17; "themal" should be "thermal".
         line 58; "5/6" should be "5/8".

Column 8, line 16; "polyamide" should be "polyimide".
         line 29; after "density" insert "was 1.29 g./ml. Specimens cut from this chip had tensile".

Column 9, line 64; "in" should be "on".

Column 10, line 38; "speciments" should be "specimens".

Column 11, line 4; "browyn" should be "brown".
          line 8; "polyimide" should be "polyimides".

Column 12, line 5; "9.6115" should be "9.1615".

Column 16, line 35; "$-\overset{O}{\underset{}{C}}$" should be "$-\overset{O}{\underset{}{C}}-$";

"$-\underset{CH_3}{\overset{CH_3}{C}}$" should be "$-\underset{CH_3}{\overset{CH_3}{C}}-$".

(2)

Signed and sealed this 13th day of October 1970.

(SEAL)
Attest:

EDWARD M. FLETCHER, JR.　　　　　　　　　　WILLIAM E. SCHUYLER, JR.
Attesting Officer　　　　　　　　　　　　　Commissioner of Patents